(12) United States Patent
Sukharevskiy (10) Patent No.: US 11,598,255 B2
(45) Date of Patent: Mar. 7, 2023

(54) CONVERTER FOR CONVERTING RECIPROCATING MOTION INTO ROTARY MOTION, AND MOTOR, GENERATOR UNIT, AND VEHICLE

(71) Applicant: Vladimir Vladimirovich Sukharevskiy, Moscow (RU)

(72) Inventor: Vladimir Vladimirovich Sukharevskiy, Moscow (RU)

( * ) Notice: Subject to any disclaimer, the term of this patent is extended or adjusted under 35 U.S.C. 154(b) by 225 days.

(21) Appl. No.: 17/254,513

(22) PCT Filed: Aug. 10, 2018

(86) PCT No.: PCT/RU2018/000526
§ 371 (c)(1),
(2) Date: Apr. 28, 2021

(87) PCT Pub. No.: WO2020/032818
PCT Pub. Date: Feb. 13, 2020

(65) Prior Publication Data
US 2021/0332746 A1    Oct. 28, 2021

(51) Int. Cl.
| | |
|---|---|
| *F02B 71/04* | (2006.01) |
| *F01B 11/00* | (2006.01) |
| *F02B 63/04* | (2006.01) |
| *F02B 75/02* | (2006.01) |
| *H02K 7/06* | (2006.01) |
| *H02K 16/02* | (2006.01) |

(52) U.S. Cl.
CPC ............ *F02B 71/04* (2013.01); *F01B 11/001* (2013.01); *F02B 63/042* (2013.01); *F02B 75/02* (2013.01); *H02K 7/06* (2013.01); *H02K 16/02* (2013.01); *F02B 2075/025* (2013.01)

(58) Field of Classification Search
CPC .......... F02B 63/04; F02B 75/02; F02B 71/04; F01B 11/001; H02K 7/06
See application file for complete search history.

(56) References Cited

U.S. PATENT DOCUMENTS

| | | | | |
|---|---|---|---|---|
| 6,116,106 A | * | 9/2000 | Miyoshi ................. | F16K 31/04 74/89.37 |
| 6,700,248 B2 | * | 3/2004 | Long ..................... | H02K 49/10 74/25 |
| 2013/0234501 A1 | * | 9/2013 | Leiber ................... | B60T 8/4081 303/10 |

* cited by examiner

*Primary Examiner* — Kevin A Lathers
(74) *Attorney, Agent, or Firm* — Nadya Reingand (57) ABSTRACT

The present converter for converting reciprocating motion into rotary motion comprises a pair of rotors counter-rotating in axial alignment, said rotors having rotor magnets and auxiliary rotor magnets fastened thereon, and a pair of rods moving reciprocally in opposite directions relative to one another along the axis of rotation of the rotors, said rods having rod magnets and auxiliary rod magnets fastened thereon, wherein at least some of the rotor magnets and/or the rod magnets are arranged such that their poles are disposed on several concentric cylindrical working surfaces simultaneously.

6 Claims, 10 Drawing Sheets

CONVERTER FOR CONVERTING RECIPROCATING MOTION INTO ROTARY MOTION, AND MOTOR, GENERATOR UNIT, AND VEHICLE

The proposed invention relates to mechanical engineering, in particular, to mechanical motion converters, engines based on them, vehicles and power generating units. It can be used in engine manufacturing, automotive industry, electric power industry and other areas.

BACKGROUND

There is a two-stroke engine with a contactless magnetic converter of reciprocating motion to rotary motion [1], [2], which consists of:
- a pair of rotors rotating opposite to each other, with rotor magnets fixed on the specific rotors,
- a pair of rods moving reciprocally opposite to each other along the axis of rotation of the rotors, with rod magnets attached to the specific rods,
- a framework and bearings,
- poles of the same polarity of the rotor magnets, facing the rods and located along the lines on cylindrical working surfaces that have at least one local maximum and one local minimum in the direction of the axis of rotation of the rotor,
- these lines are such that when the poles of the magnets of one rod reach the areas of local maxima of those lines of one rotor at the extreme point of their movement, the poles of the other rod magnets also reach the extreme point of their movement, but in the areas of local minima of those lines of the same rotor.

The disadvantage of this converter is that specific interaction magnet power of the rotor magnets and rods is not large. This is explained by the small interaction area of the poles and leads to the bulkiness of the engine and high specific cost of the magnets in terms of engine power. Each magnet of the rotor or rod is engaged into the force interaction with only one of its poles, since only one pole is placed on the cylindrical working surface.

Known converters of reciprocating motion to rotary motion [3], [4], [5], [6] also use the interaction of reciprocating rod magnets and wave-like rotating rotor magnets. However, even in these examples magnets extended in the radial direction have small interaction surface with each other, and as a result, low efficiency.

It should be emphasized that all known analogues have only two cylindrical working surfaces on which power is transferred from the rod to the rotor, namely, one cylindrical working surface of the rod and one cylindrical working surface of the rotor. These surfaces limit the air gap between the rod magnets and the rotor magnets.

SUMMARY

The technical result of the invention is the creation of a contactless magnetic converter of reciprocating motion into rotary motion, with the rods moving opposite to each other and rotors rotating opposite to each other, which can be used in an internal combustion engine, which in turn will be used in a power generating unit and/or a vehicle.

A converter for converting of reciprocating motion into rotary motion, comprising:
- a pair of rotors rotating in opposite directions to each other, with rotor magnets fixed on the rotors,
- a pair of rods moving reciprocally opposite to each other along an axis of rotation of the rotors, with rod magnets attached to the rods, a framework and bearings,
- poles of the same polarity of the rotor magnets, facing the rods and located along lines on cylindrical working surfaces that have at least one local maximum and one local minimum in the direction of the axis of rotation of the rotor,
- these lines are such that when the poles of the magnets of one rod reach areas of local maxima of those lines of one rotor at an extreme point of their movement, the poles of the other rod magnets also reach an extreme point of their movement, but in areas of local minima of those lines of the same rotor,
- characterized in that at least some rotor magnets and/or rod magnets have their poles placed simultaneously on several concentric cylindrical working surfaces.

The specified closed line can be a closed curve, polyline, or a combination of both. The line is imaginary and reflects the area of movement of the poles of the rotor magnet. For reasons of structural simplicity, it is better to use a polyline consisting of elliptical arcs. The specified polyline curve is formed by the planes section of a cylindrical working surface.

The rods always move with the same amplitude having the opposite phase motion, i.e. they move in the opposite directions, reaching the extreme positions of their movement, which must be provided by the synchronizer external to the converter or by the engine design where the converter is used.

The line should be of such a shape that when the magnet poles of one rod reach the local maxima of the line of the rotor poles, the magnet poles of the other rod shall reach the local minima of the indicated line of the same rotor. In this case, the movement of the rods will create a torque on the rotor.

Local minimum and local maximum are understood as local minimum and local maximum along the Z axis coinciding with the axis of the rotor of a three-dimensional function that coincides with the specified closed line at all points.

All magnets have predominantly radial magnetization, i.e. the vector of magnetic induction created by rod magnets and rotor magnets is directed along the radius at all points of the magnet. With a different type of magnetization, the efficiency of the converter decreases.

Bearings, including rod guides, can be of any type—rolling, sliding, magnetic, etc. In some cases, parts of other components, such as framework, may play the role of bearing.

The rods shall move on guides, and the rotor shall rotate on bearings preventing it from moving translationally along the axis of movement of the rod in the operating mode (power transfer mode). The axes of rotation of the rotors and the axes of reciprocating motion of the rods must coincide.

A cylindrical working surface is a surface on which the poles of the rod magnets or rotor magnets are placed and interact through a small air (or gas in case of a gas medium) gap with the poles of the rotor magnets or rod magnets, respectively. Concentric cylindrical working surfaces are several cylindrical working surfaces on one axis, coinciding with the axis of rotation of the rotors, but with different radii.

The main difference between the proposed converter and the prototype is that it has more than two concentric cylindrical working surfaces on which power is transferred from the rods to the rotors through magnetic interaction. The strength of the magnetic interaction almost does not depend on the depth of the magnet in the radial direction, starting from a certain depth of the magnet. Thus, for effective use of magnets, the surface area of the interaction shall be increased, while the depth of the magnets in the radial direction shall be reduced. In the proposed converter, this is done by placing the poles of the magnets of the rotors and/or rods simultaneously on two concentric cylindrical working surfaces. In this case, in contrast to the prototype, both poles of the rod magnet and/or rotor magnet, placed directly on two cylindrical concentric working surfaces, are simultaneously involved in the force magnetic interaction. Thus, it is possible to increase the strength of the magnetic interaction of the rod and rotor magnets with the same (or smaller) volume of rod and rotor magnets, compared to the prototype. This allows to lighten the rods, which in the future will facilitate increasing frequency and power of the engine based on the proposed converter.

In the proposed converter, there are at least four cylindrical concentric working surfaces, since there are at least two gaps. For example, the poles of the rod magnets are simultaneously placed on two concentric cylindrical working surfaces with radii $R_1$ and $R_2$, and interact through two gaps with the poles of rotor magnets, which poles are placed on two concentric cylindrical working surfaces with radii $R_1 - \Delta R$ and $R_2 + \Delta R$, where $\Delta R$ is the width of the gap. In this example, rod magnets act as the "middle" part of the magnetic system. This is convenient for use in an internal combustion engine. It is also possible to use rotor magnets as the "middle" part of the magnetic system. Then the poles of the rotor magnets will be simultaneously placed on two concentric cylindrical working surfaces with radii $R_1$ and $R_2$, and will interact through the gaps with the poles of rod magnets, which poles will be placed on two concentric cylindrical working surfaces with radii $R_1 - \Delta R$ and $R_2 + \Delta R$, where $\Delta R$ is the width of the gap. In general, the total number of concentric cylindrical working surfaces of the proposed converter can be 2N, where N is any natural number greater than one. At N>2, both the poles of the rotor magnets and the poles of the rod magnets are simultaneously placed on two concentric cylindrical working surfaces, due to the fact that the rotor magnets and rod magnets must alternate in the radial direction for the converter to work correctly.

The angular direction and the axial direction along the rod axis are understood as an angle and a coordinate in cylindrical coordinates, respectively, where the coordinate axis is directed along the rotor axis.

The angle of visibility of the rotor magnet is the angular distance between the edges of the rotor magnet in a plane perpendicular to the rotor axis with the vertex of the angle at the intersection of this plane and the rotor axis.

Similarly, the angle of visibility of the interpolar gap of the rotor magnets is the angular distance between the edges of the nearest poles of the rotor magnets in a plane perpendicular to the rotor axis with the center at the intersection of this plane and the rotor axis.

The operating mode of the converter is the mode of power transfer from the reciprocally moving rod to the rotating rotors. In the operating mode, the magnets of the same rotor, which poles are placed on different concentric cylindrical working surfaces, must be stationary relative to each other. To achieve the greatest magnetic force, the poles of the rotor magnets facing each other, which are at the same level at the rotor axis, must have the opposite polarity, and the local maxima and minima of the mentioned lines of one rotor must be reached at the same angles of the cylindrical coordinate system relative to the axis of the rotors.

In the case of two gaps in the radial direction, and, accordingly, four concentric cylindrical working surfaces, two versions of the layout of the magnetic system are possible:
1) the poles of the rotor magnets are simultaneously placed on two concentric cylindrical working surfaces, the rotor rotates between the reciprocally moving rods, and the poles of the magnets of each rod are placed separately, each on its own cylindrical working surface, while the poles of the magnets of one rod facing each other have the opposite polarity at the same level along the axis of the rotors;
2) the poles of the rod magnets are placed on two concentric cylindrical working surfaces, the rotor rotates around the reciprocally moving rods, and the poles of the rotor magnets are placed separately, each on its own cylindrical working surface, while the poles of the magnets of one rotor facing each other have the opposite polarity at the same level along the axis of the rotors;

The poles of the magnets opposite to those placed on the cylindrical working surface should preferably be closed with a magnetic circuit to increase the magnetic flux in the air gap, for example, a "back" of the rotor in the above variant 2) can be made of electrical steel.

The framework and bearings of the converter must provide the above features and the interaction of the parts of the converter. Other elements can perform the functions of the framework or its parts. For example, when using a converter in an internal combustion engine, a tube with cylinders may be the framework, and the pistons—the slide guides of the rods.

Rotor magnets have a rather complex shape, which increases the cost of their manufacture. Therefore, it is possible to make the rotor poles stacked with same pole end made of a material with high magnetic permeability, for example, from electrical steel.

The invention described above can be manufactured in various modifications. We will specify the features of one of them hereunder.

Modification. The converter described above can have the additional characteristics specified in clauses 1-5 below.

1. There is an additional rod magnet for at least one rod magnet, which poles of opposite polarity are placed on the same cylindrical concentric working surface at the same level along the rotor axis.

The additional rod magnet is installed mainly at the same coordinate along the rotor axis Z (in other words, at the same level along the axis of the rotors) as the main pole. The maximum contribution of additional rod magnets of the same size to the magnetic interaction of rod magnets and rotor magnets is equal to the contribution of rod magnets, so it is possible to achieve double magnetic interaction force with a constant volume of rotor magnets.

2. The angular distance between the additional pole of the rod and the main pole of the rod is equal to the sum of the angles of visibility of the pole of the rotor magnet and the interpolar gap. At this angular distance, the magnetic force of interaction between the rod and rotor magnets is the highest.

3. The magnets of each rod simultaneously interact with the magnets of both rotors. With this arrangement of the magnetic system, the converter uses rotor magnets installed both at positive slope and at negative slope with respect to the plane perpendicular to the rotor axis. This increases the area of the interacting magnetic poles with the configuration of the rotors staying the same. Accordingly, the magnetic force of interaction and the maximum transmitted power increases.

4. The converter has rotor magnets additional poles that are adjacent to the rotor magnets poles having the same polarity and placed at the same cylindrical working surfaces. Additional poles of the rotor magnets are necessary to increase the force of interaction between the poles of the rods and the rotors when the rods move near dead points. These additional poles are connected through the gap equal in linear distance to the interpolar gap near the "plateau" of the rotor magnets.

5. The rotor magnets can be rotated and/or moved relative to each other if necessary. This may be necessary when switching the converter from the operation mode to the free running For example, when one of the rows of rotor magnets is shifted axially so that the poles of the rotor magnets facing each other have the same polarity, the total magnetic flux in the gap is close to zero, and the rods are in free movement, which means that they move without having connection with the rotors. When making some rotor magnets movable, for example, with the possibility to shift the inner part of the rotor with all the magnets of this part of the rotor by the distance of the length of the rotor magnet and the interpolar gap along the axis of the rotors, it is possible to obtain the total force interaction of the rotor and rod magnets which is close to zero. Indeed, if, for example, the poles of the same polarity of the rotor magnets face the poles of the rod magnets at any point of Z coordinate (in other words, are at the same level along the axis of the rotors), their total magnetic field will be close to zero. In this way, the converter can be switched out of power transmission mode (operating mode) if necessary. This may be used, for example, as a clutching function for gear shifting in a vehicle with manual transmission.

The engine using the described converter can be either internal or external combustion engine, or, for example, pneumatic or hydraulic engine. When used in an internal combustion engine, it is more convenient to use a two-stroke cycle with self-ignition from compression. Pistons, for example, made of graphite, are installed on the rods to ensure machine operation without liquid lubrication. Cylinders play the role of the guides of the rods (some parts of the rods may have additional guides).

It is more efficient to use the converter with the Modification. In this case, the oppositely moving pistons interact simultaneously with two oppositely rotating rotors via the rods, i.e. they are synchronized in the operating mode. In addition, expensive rotor magnets are used more fully, since each movement of the rods involves both slopes (positive and negative) of the specified lines on cylindrical surfaces.

The two-stroke engine has two working cylinders on one axis and two pairs of counter-moving pistons with piston stroke limiters, direct-flow valveless scavenging. Two engine pistons are rigidly connected to one converter rod, and the other two pistons are connected to each other and the other converter rod.

The use of two engine cylinders is motivated by the fact that when using one engine cylinder, it is not possible to achieve stable operation under load, and with three or more cylinders, it becomes more difficult to achieve simultaneous start of the combustion in two or more cylinders. Besides, the internal friction of the pistons against the cylinders increases.

The piston stroke limiters prevent the point of closest approach of the pistons in the engine cylinder from shifting when one of the rod goes out of sync with the rotors. In such a non-routine event, the converter returns to the operating mode within one stroke of the rod.

When using graphite pistons and a precision alloy cylinder with a very low temperature coefficient of linear expansion in the operating temperature range of the engine (for example, Invar), it is possible to go without the o-rings in the engine.

For use in aviation, the rotors of the converter are equipped with propeller blades, and the engine cylinders are located in the tube which plays the role of the converter framework. The convenience of this engine design is the possibility to install oppositely rotating blades without reducers.

For use in a land vehicle, a gearbox drive or a wheel of the vehicle is attached to the converter rotor. For use in water transport, the converter rotors are connected by the drive to the water propellers.

A power generating unit using an engine based on the proposed converter can have the drive connected directly to the converter rotors or the power generating unit rotors can be mounted on the converter rotors. Also, rotor magnets can be used to directly generate current in the stator windings.

An engine and/or a power generating unit with converter described in the present invention can be used in air, water, or ground vehicles.

A car using an engine based on the proposed converter can have the drive connecting the rotors either with the gearbox or directly with the wheels. The second variant is more advantageous in terms of vehicle efficiency. The car can also use a power generating unit based on the proposed engine and converter to power traction electric motors and batteries.

BRIEF DESCRIPTION OF THE DRAWINGS

It is difficult and uninformative to show all the details of the converter or engine described in the present invention in one drawing. Therefore, different figures show only those parts which relative position explains the principle of operation.

DETAILED DESCRIPTION OF THE PREFERRED EMBODIMENT

Figure 1:
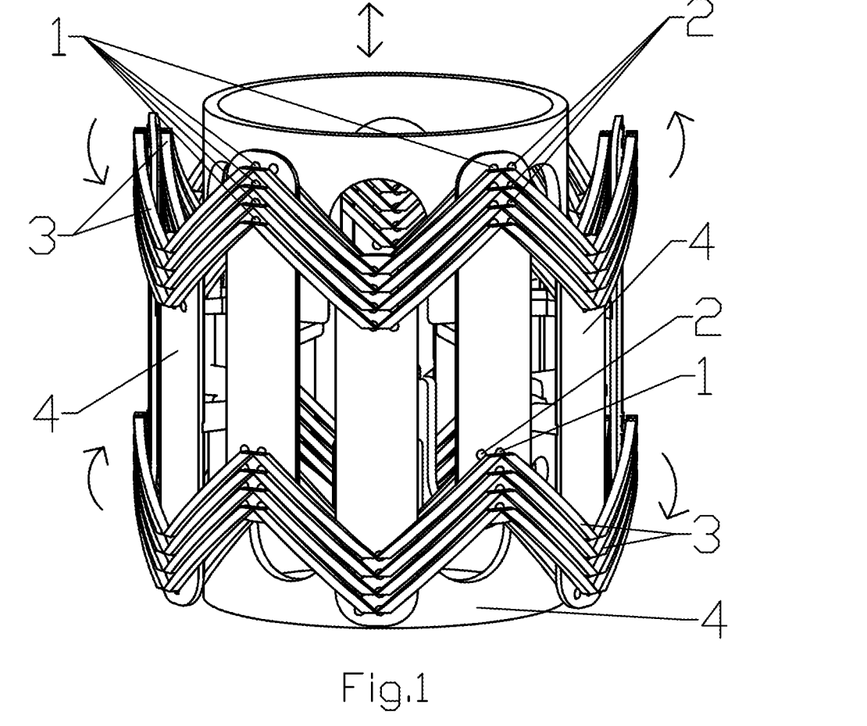
FIG. 1 Converter magnetic system with rod magnets 1, additional rod magnets 2 located on the rods 4, moving reciprocally, which is indicated by a double arrow. The rotor magnets 3 rotate together with the rotors (not shown in FIG. 1) in the corresponding directions (shown by arrows). The rods consist of a cylindrical part that provides sliding along the guide and curved plates on which the rod magnets 1 and additional rod magnets 2 are directly fixed.

FIG. 1 shows the internal part of one of the versions of the proposed converter. The rod magnets 1 and additional rod magnets 2 interact with the rotor magnets 3 through the air gap. The arrows show the direction of rotation of the rotor magnets 3 and the reciprocating motion of the rods 4. The upper group of rotor magnets 3 belongs to the one rotor, the lower group belongs to the other rotor. The rotors themselves, on which the rotor magnets are fixed, as well as the bearings and framework are not shown in FIG. 1.

Figure 2:
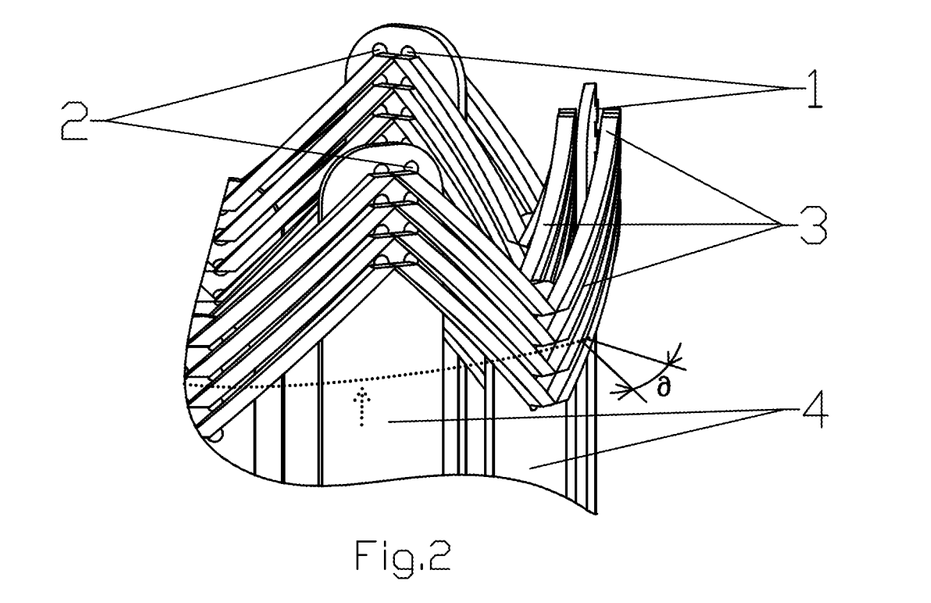
FIG. 2 An enlarged part of the magnetic system with rod magnets 1, additional rod magnets 2 on the rods 4 and rotating together with the rotors (not shown in FIG. 2) by the rotor magnets 3. The figure shows the angle θ between the edges of the poles of the rotor magnets in the plane perpendicular to the axis of the rotor, which we will call the angular interpolar distance. The section plane is indicated by a dotted line, and the view on the section is indicated by a dotted arrow. The section will be shown in FIG. 3.
Figure 3:
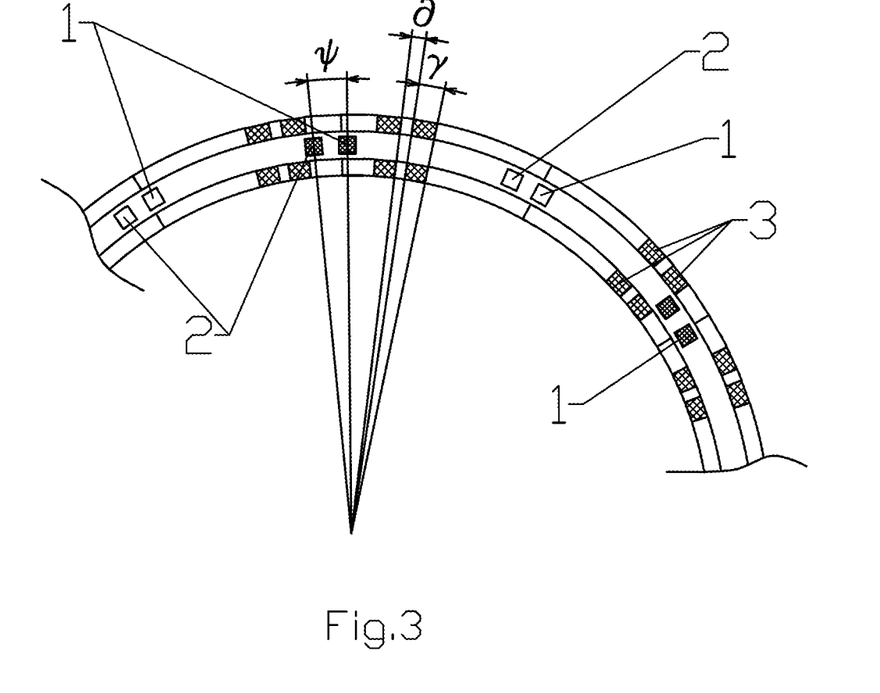
FIG. 3 Section of the rotor magnets 3, rod magnets 1 and the additional rod magnets 2 in the plane perpendicular to the axis of the rotors. The figure shows the angle θ, the visibility angle of the rotor magnet ∂ and the angular distance between the rod magnet and the additional rod magnet iv. The rods in FIG. 3 are not shown. The section is indicated by a dotted line in FIG. 2, the view is indicated by the dotted arrow (from the bottom).

FIG. 2 is a close-up of the rotor magnets 3, rods 4 with the rod magnets 1 and additional rod magnets 2. The dotted line shows the section line and the arrow shows the direction of view on the section. The section is shown in FIG. 3. The angle w is the angular distance between the rod magnet 1 and the additional rod magnet 2. The angle $\gamma$ is the angular distance between the edges of the rotor magnet 3, in other words, the angle of visibility of the rotor magnet 3 from a point on the rotor axis in a plane perpendicular to this axis. Similarly, the angle $\theta$ is the angle of visibility of the interpolar distance of the rotor magnets 3 from a point on the rotor axis in a plane perpendicular to this axis. For the converter with the Modification, the ratio $\psi=\gamma+\partial$ must be fulfilled. Providing this condition, the contribution to the magnetic force from the interaction of the rotor magnets 3 and the additional rod magnets 2 is maximal, since the magnetic force from this contribution is directed in the same direction as from the interaction of the rotor magnets 3 and rod magnets 1.

Figure 4:
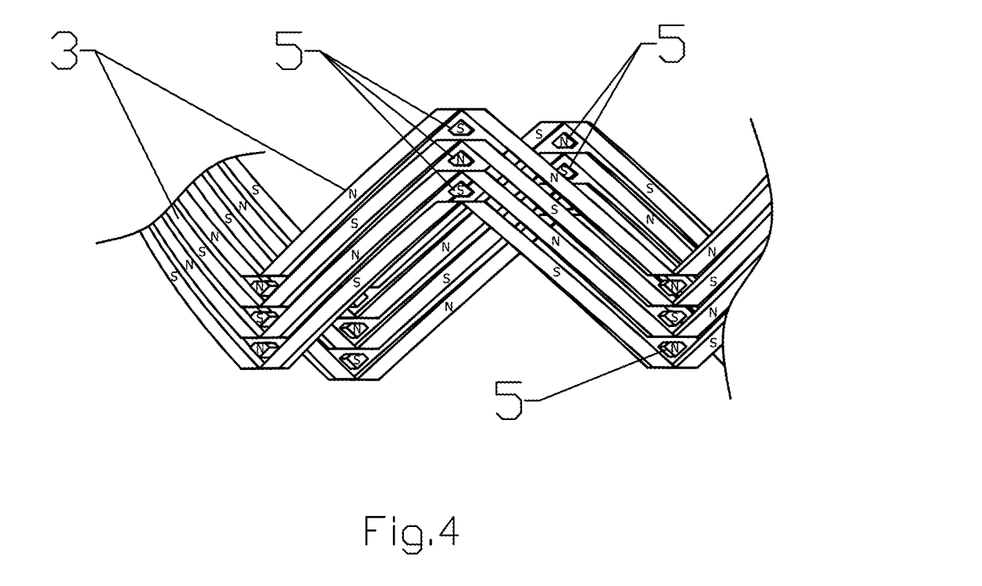
FIG. 4 Rotor magnets 3 and additional rotor magnets 5. The letters S and N exemplarily indicate the poles of magnets. The poles may be positioned differently. The magnetization of the rotor magnets 3, the additional rotor magnets 5 and rod magnets 1, the additional rod magnets 2 is radial, which means that the magnetic induction vector is directed to the axis of rotation or from the axis of rotation. Only the magnets of the outer part of one rotor 6 are shown (the rotor itself in FIG. 4 is not shown).

FIG. 4 shows the magnets 3 of the outer part of one of the rotors, as well as additional magnets 5 of the outer part of this rotor. The letters N and S indicate the polarity of the magnets. The polarity can be different, it is only important that the polarity of the rotor magnets 3 alternates in the direction of the rotor axis, and the polarity of the additional rotor magnet 5 coincides with the polarity of the rotor magnet 3 to which it is adjacent.

When the rods 4 move reciprocally by the action of an external force, the rod magnets 1 and additional rod magnets 2 (if any) move relative to the rotor between the rotor magnets 3 along an equilibrium path that depends on the external load. In this case, the rods 4, moving towards each other or from each other, impact the rotor magnets 3, causing them to rotate together with the rotors.

A conditional mechanical analogy is the "screw-nut" interaction, since the specified line of poles of the rotor magnets has certain slopes relative to the plane perpendicular to the axis of the rotors. The slopes can be smoothly changing from positive to negative forming the wavy line of the poles of the rotor magnets 3, or changing stepwise (permanently positive to permanently negative with a passage through zero) forming a polyline.

In the interaction of the rod magnets 1 and the additional rod magnets 2 of both rods 4 with both groups of rotor magnets 3 and the additional rotor magnets 5 of the rotors rotating in opposite directions, modules of the slopes shall be mostly the same in the areas of interaction of the rod magnets 1 with the rotor magnets 3, while the slopes themselves shall be the opposite. With this interaction, the rotor magnets 3 are used to the maximum, and the overall efficiency of the converter increases.

The minimum and/or maximum of the specified pole line of the rotor magnets 3 can be of a certain length (the "plateau" type), as shown in FIGS. 1, 2 and 4. This can make it possible to increase the time spent by the rod 4 near dead points, for example, to improve the gas exchange processes in the engine using the proposed converter. In addition, such a "plateau" increases the efficiency of using additional poles of the rods 2 when passing dead points.

The rotors 6 rotate in the opposite directions, so reactive torques are compensated inside each rod 4 and there is no need to prevent the rods 4 from rotating around their own axis. This greatly simplifies the design and reduces friction.

The maximum force of interaction of the rod magnets 1 and the additional rod magnets 2 with the rotor magnets 3 is achieved if the rod magnets 1 and the additional rod magnets 2 pass above the middle of interpolar gap of the rotor magnets 3. Additional rotor magnets 5 maintain a high level of magnetic interaction force when approaching dead points. For a high level of magnetic force, it is necessary that the pole of the additional rod magnet 2 were opposite to the pole of the rod magnet 1 when they are placed on the same working cylindrical surface. Then, with alternating polarities of the rotor magnets 3, the rod magnets 1 and additional rod magnets 2 will interact immediately with all the nearest rotor magnets 3 and additional rotor magnets 5, increasing the level of interaction magnetic force.

Since the poles of the rod magnets 1 and additional rod magnets 2 are placed on two concentric cylindrical working surfaces at once, each rod magnet 1 interacts simultaneously with four rotor magnets 3, and each additional rod magnet 2 also interacts simultaneously with four rotor magnets 3.

To increase the magnetic force, the number of rows of rod magnets 1, additional rod magnets 2, rotor magnets 3 and additional rotor magnets 5 can be increased in both axial and radial directions. At the same time, both rod magnets 1 and additional rod magnets 2, as far as rotor magnets 3 can be placed on two cylindrical working surfaces at once. When alternating several "layers" of rod magnets 1 and additional rod magnets 2 with rotor magnets 3 in the radial direction, one of the possible schemes is that part of the rotor magnets 3 and part of the rod magnets 1 and additional rod magnets 2 are placed at once on two cylindrical concentric working surfaces. When choosing the construction, you must be guided by the required diameter and length of the converter, as well as the ease of manufacture and low weight of the rods 4 with rod magnets 1 and additional rod magnets 2.

The magnetization vectors of the rod magnets 1 and additional rod magnets 2, rotor magnets 3 and additional rotor magnets 5 should preferably be directed along the radii, i.e. directed to or from the axis of rotation of the rotors in a plane perpendicular to this axis.

Figure 5:
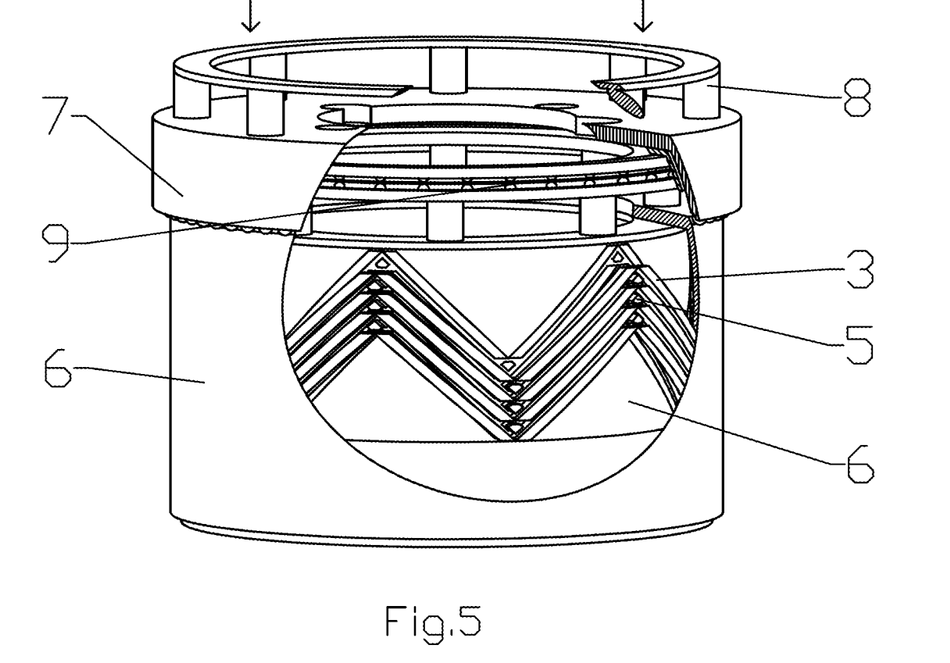
FIG. 5 One of the rotors 6 with the rotor magnets 3 and additional rotor magnets 5, rotating relative to the fixed framework 7. The inner part of the rotor 6 is movable along the axis of rotation by means of a pusher 8 connected to the inner part of the rotor 6 by means of a support bearing 9. On the inner part of the rotor 6, the number of rows of magnets 3 in the axial direction is one more than on the outer part. This is necessary so that when the inner part of the rotor 6 is shifted down by the height of the magnet of the rotor 3 and the interpolar gap in the axial direction, the magnetic field from the magnets of the rotor 3 in the area where the rod magnets 1 and the additional rod magnets 2 are located were close to zero. Rods and rod magnets are not shown in FIG. 5. For clarity, a cylindrical cutout is made in the framework 7, the outer part of the rotor 6 and the pusher 8. The direction of the shift (down) is indicated by arrows.

FIG. 5 shows one of the rotors 6 with the rotor magnets 3 and additional rotor magnets 5, which can rotate relative to the fixed framework 7. The inner part of the rotor 6 is movable along the axis of rotation by means of a pusher 8 connected to the inner part of the rotor 6 by means of a support bearing 9. On the inner part of the rotor 6, the number of rows of magnets 3 in the axial direction is one more than on the outer part. This is necessary so that when the inner part of the rotor 6 is shifted down by the height of the magnet of the rotor 3 and the interpolar gap in the axial direction, the magnetic field from the magnets of the rotor 3 in the area where the rod magnets 1 and the additional rod magnets 2 are located were close to zero.

Figure 6:
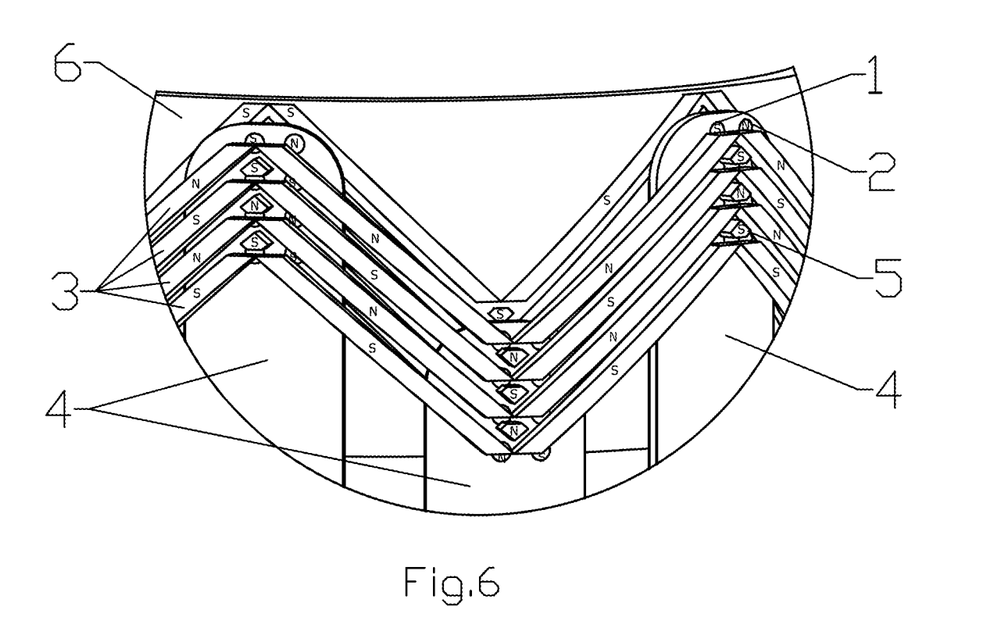
FIG. 6 Cutout of the inner part of the rotor 6 with rotor magnets 3 and additional rotor magnets 5, the magnets 3 of the outer part of the rotor 6 and the additional magnets of the outer part of the rotor 6. For clarity, the outer part of the rotor 6 is not shown. Part of the rods 4 with the rod magnets 1 and additional rod magnets 2 are shown. The letters S and N indicate the poles of magnets. The direction of magnetization alternates in the direction of the axis of rotation.

FIG. 6 is a close-up of the cutout of the inner part of rotor 6 with rotor magnets 3 and the additional rotor magnets 5, the magnets 3 of the outer part of the rotor 6 and the additional magnets of the outer part of the rotor 6. For clarity, the outer part of the rotor 6 is not shown. Part of the rods 4 with the rod magnets 1 and additional rod magnets 2 are shown. The letters S and N indicate the poles of magnets. The direction of magnetization alternates depending on the direction of the axis of rotation, the magnetization vector at each point of the magnets is parallel to the radius at that point (radial magnetization).

To start the converter, it is desirable to impart some initial rotation to the rotor 4 in the desired direction, in case the rods 3 are at dead points and the movement direction of the rotor 4 at the beginning of their movement is not determined.

Figure 7:
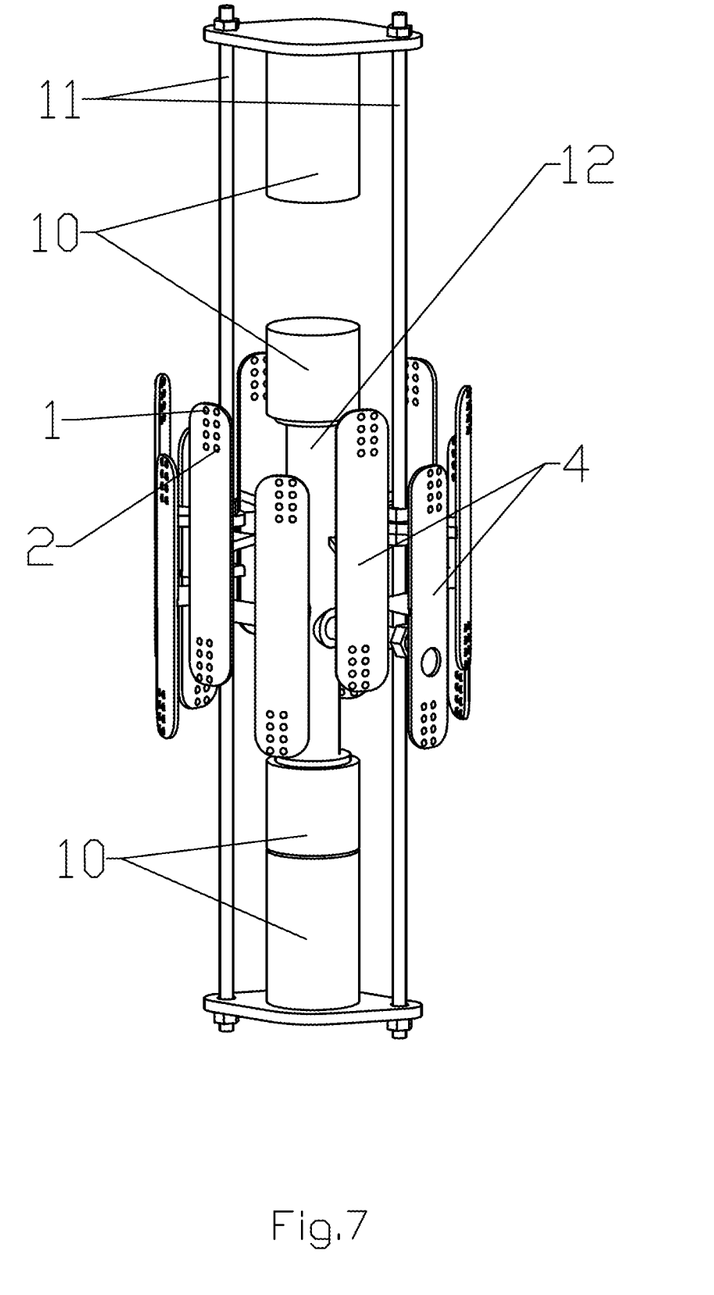
FIG. 7 Part of the engine with the converter: the connection of the outer pistons 10 with the pull rods 11 and one of the rods 4, as well as the connection of the inner pistons 10 with each other by the piston connector 12 and with the other rod 4. For clarity, the cylindrical part of the rods 4 is not shown.

FIG. 7 shows the part of the engine with the converter: the connection of the outer pistons 10 with the pull rods 11 and one of the rods 4, as well as the connection of the inner pistons 10 with each other by the piston connector 12 and with the other rod 4. For clarity, the cylindrical part of the rods 4 is not shown. The pull rods 11 must be made of a material that has a high tensile strength, since the pull rods 11 experience mainly tensile loads when the cylinders are operated alternately.

Figure 8:
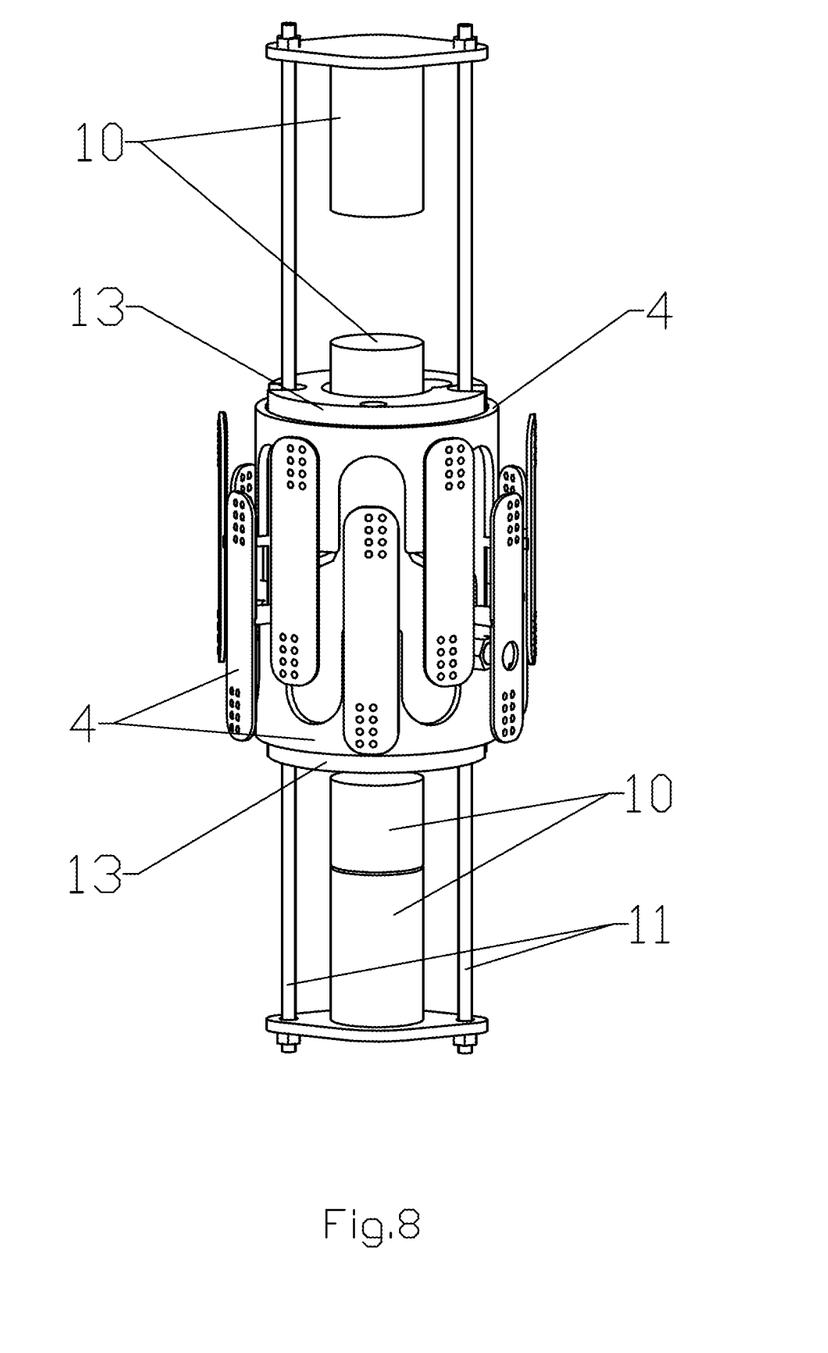
FIG. 8 Part of the engine with the converter: cylindrical parts of the rods 4, slide guide 13, pistons 10, pull rods 11.

FIG. 8 shows the part of the engine with the converter in the continuation of FIG. 7. It also shows the cylindrical parts of the rods 4 moving along the slide guide 13. The slide guide 13 does not experience significant loads from the rods 4 during operation and can be made, for example, of graphite or fluoropolymer.

Figure 9:
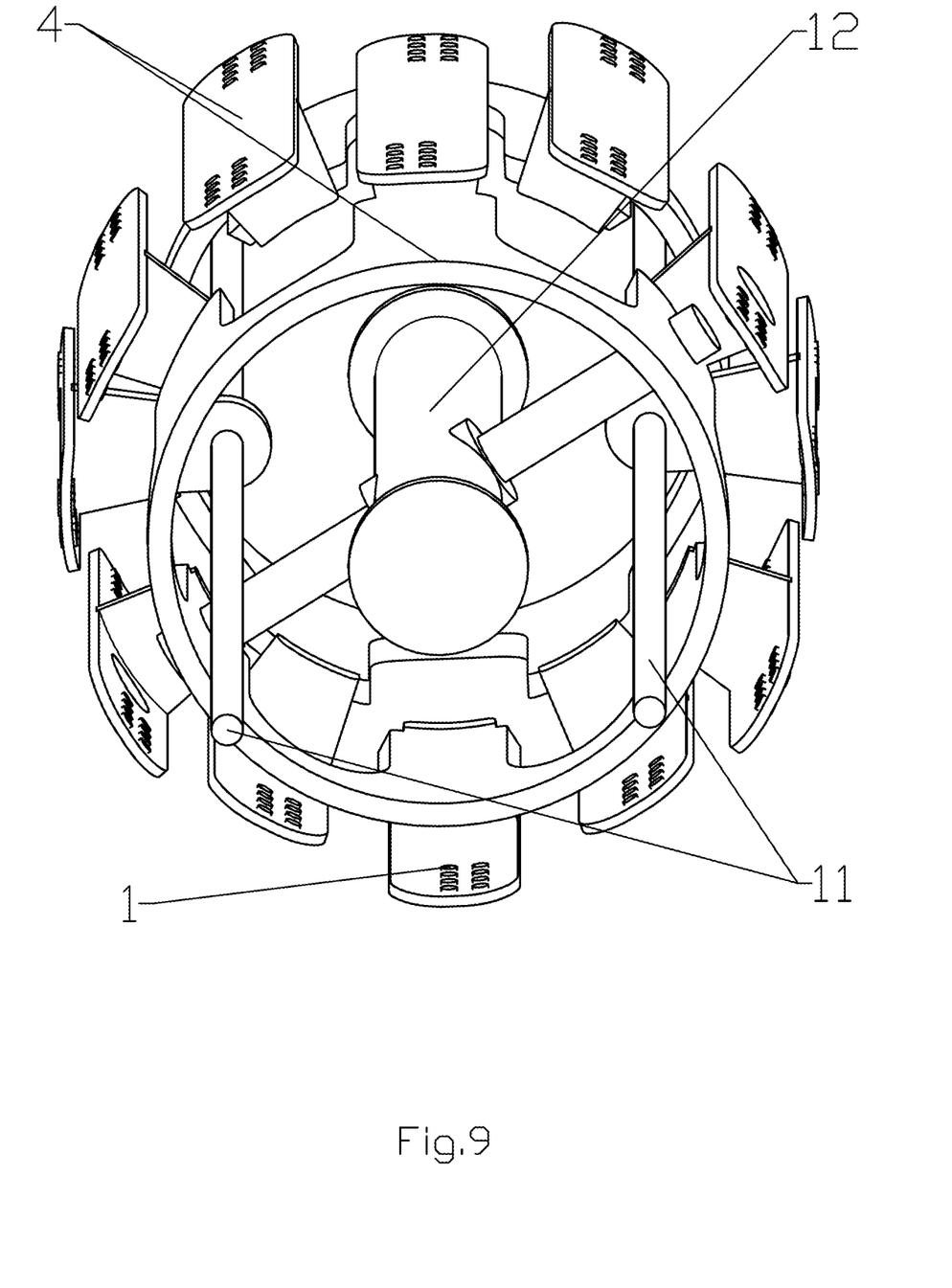
FIG. 9 Part of the engine with the converter: the connection of one rod 4 with the pull rods 11, and the other rod 4 with the internal piston connector 12.

FIG. 9 shows the part of the engine with the converter: the connection of one rod 4 with the pull rods 11, and the other rod 4 with the internal piston connector 12. To increase the frequency and power of the engine, the rods 4, pull rods 11, and connector of the internal pistons 12 should be as light as possible, and can be made, for example, of carbon composite material.

Figure 10:
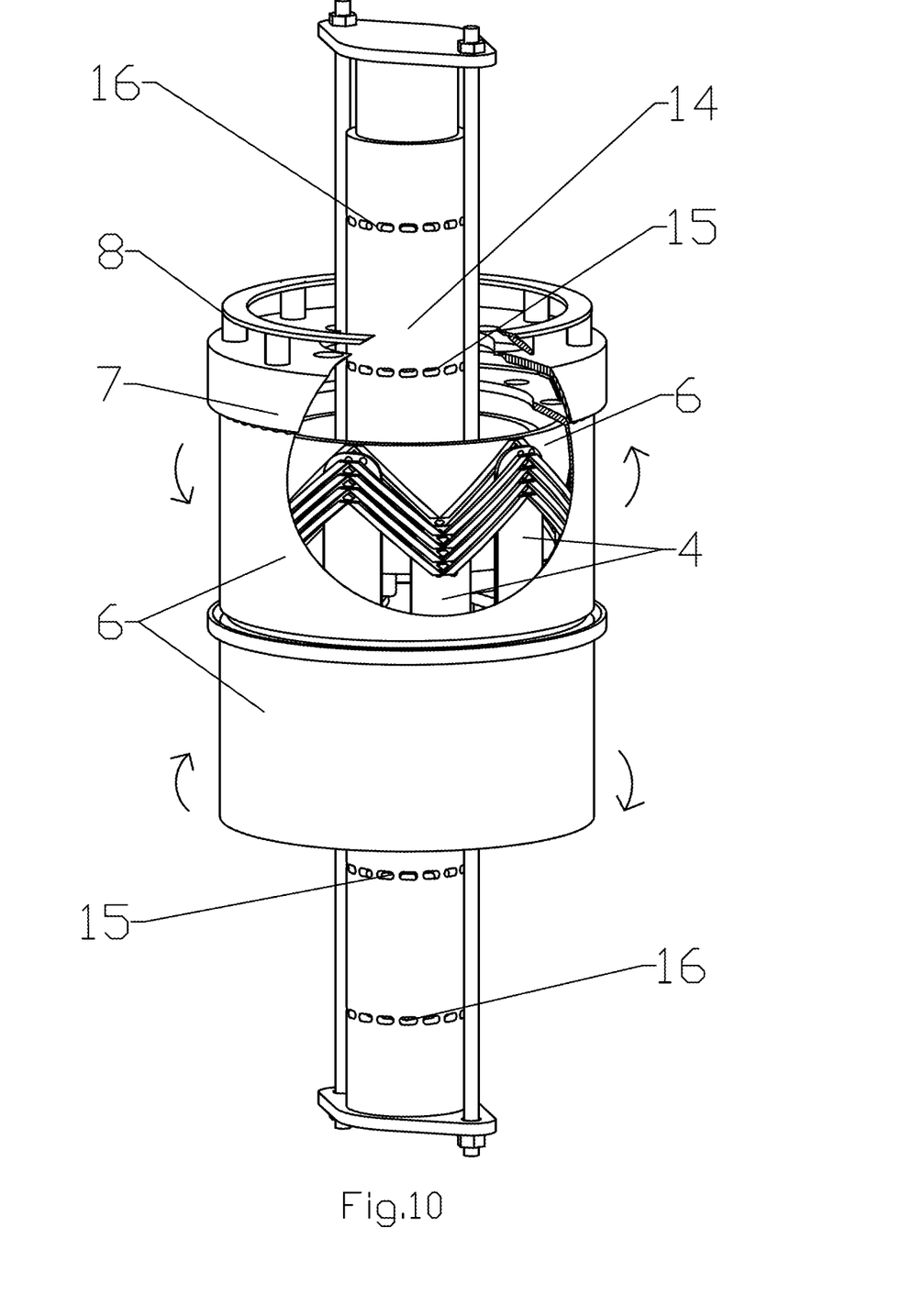
FIG. 10 Part of the engine with the converter: cylinder 14 with intake 15 and exhaust 16 ports. The lower part of the framework 7 and the cylindrical parts of the rods with guides are not shown.

FIG. 10 shows the part of the engine with the converter: cylinder 14 with intake 15 and exhaust 16 ports. The lower part of the framework 7 and the cylindrical parts of the rods with guides are not shown. Arrows indicate the direction of rotation of the rotors 6.

Figure 11:
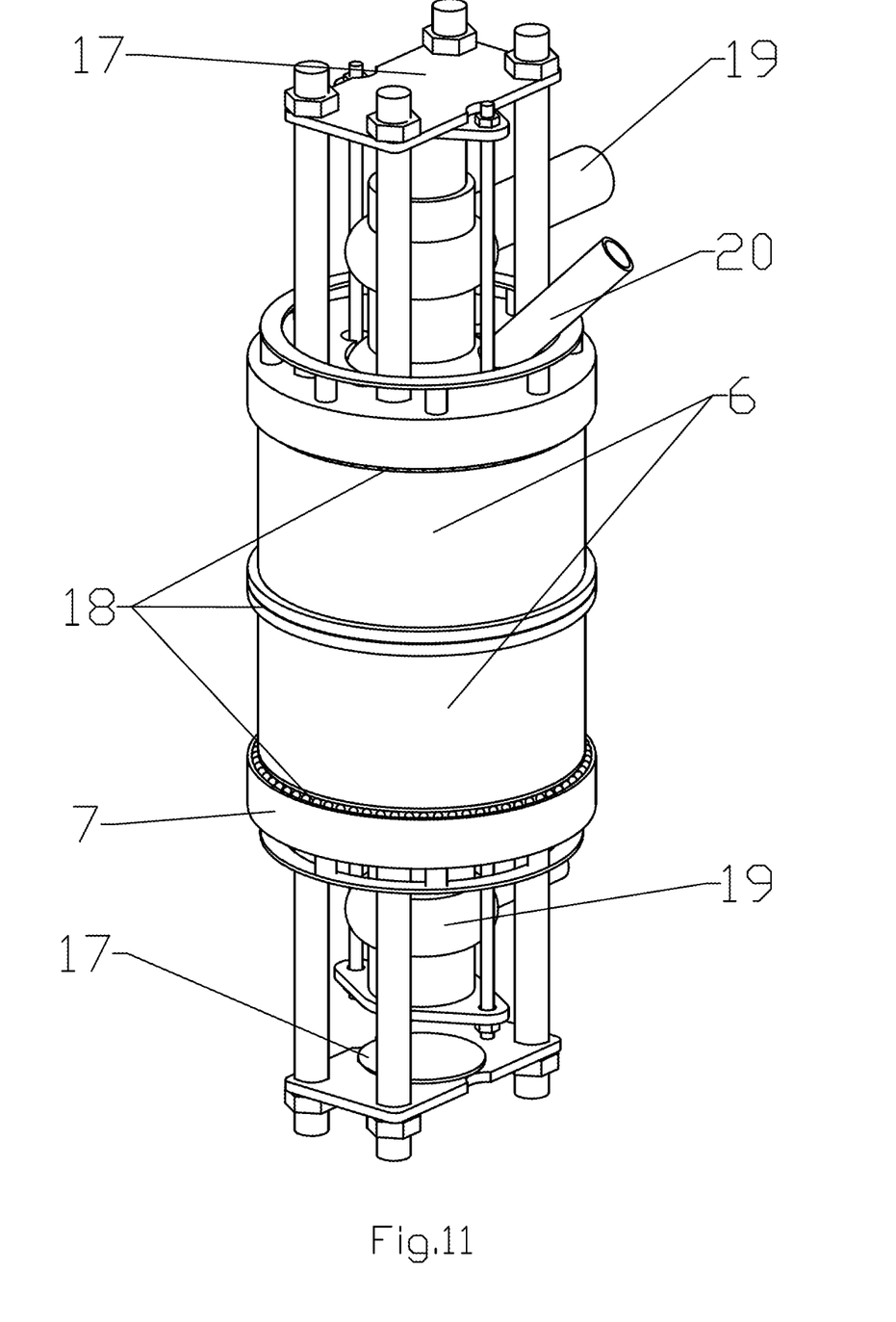
FIG. 11 General view of the engine with the converter: piston stroke limiters 17, rotor bearings 18, exhaust manifolds 19 and intake manifold 20.
Figure 12:
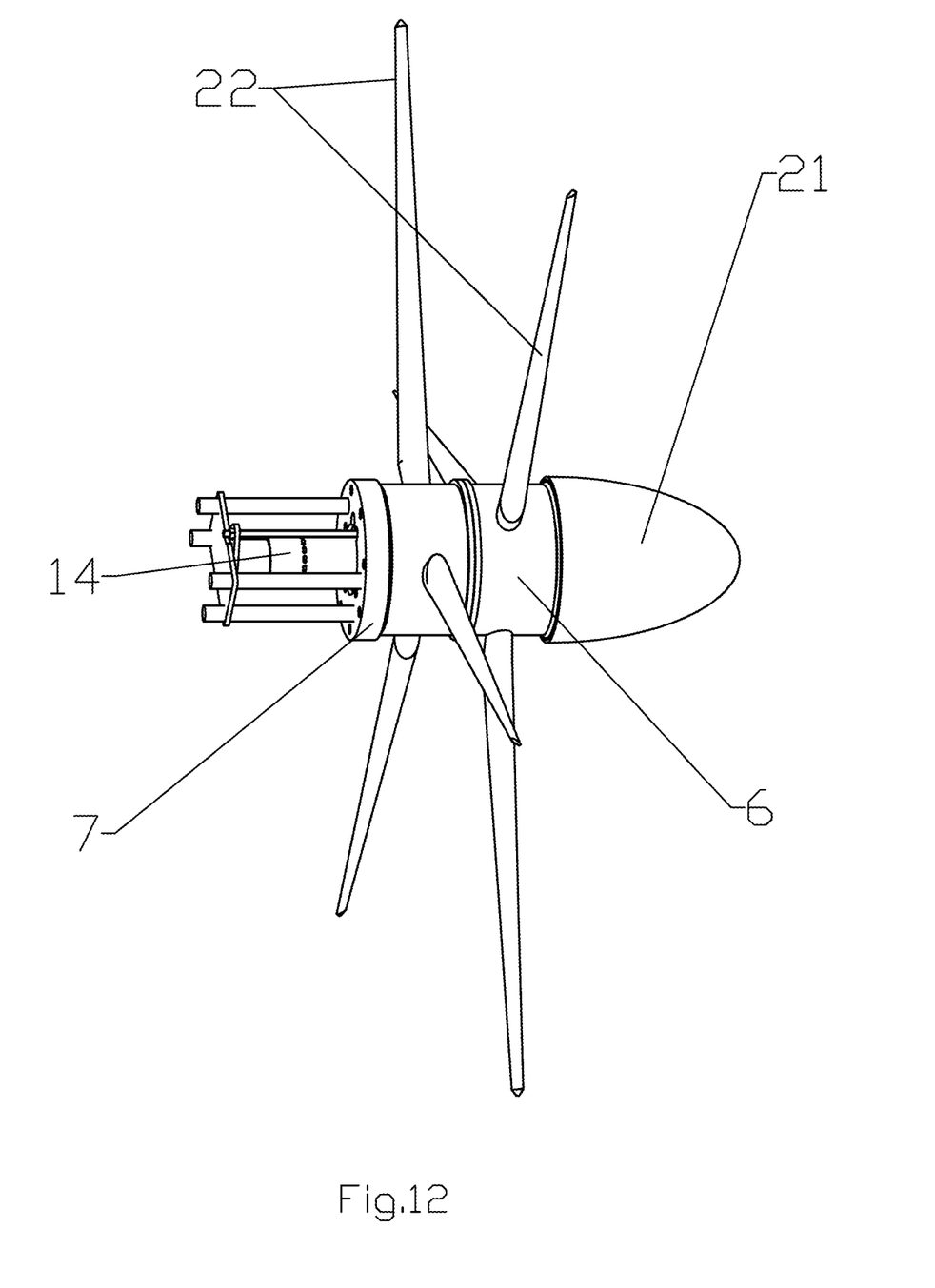
FIG. 12 Aircraft engine: fairing 21 and blades 22 mounted directly on the rotors 6. The intake and exhaust manifolds are not shown.

FIG. 11 shows the general view of the engine with the converter: piston stroke limiters 17, rotor bearings 18, exhaust manifolds 19 and intake manifold 20. The intake manifold 20 connects the intake ports 15 with a hose inside the slide guide 13 (are not shown in FIG. 11). Thus, the air-fuel mixture can only be supplied from one side of the engine. This is important for the aviation version of the engine shown in FIG. 12: the fairing 21 and the blades 22 are installed directly on the rotors 6. The intake and exhaust manifolds are not shown. The framework 7 can be attached directly to the wing or nose of the aircraft. The presence of opposite-rotating blades can be used in vertical take-off aircraft, such as drones, helicopters, and flying cars.

Figure 13:
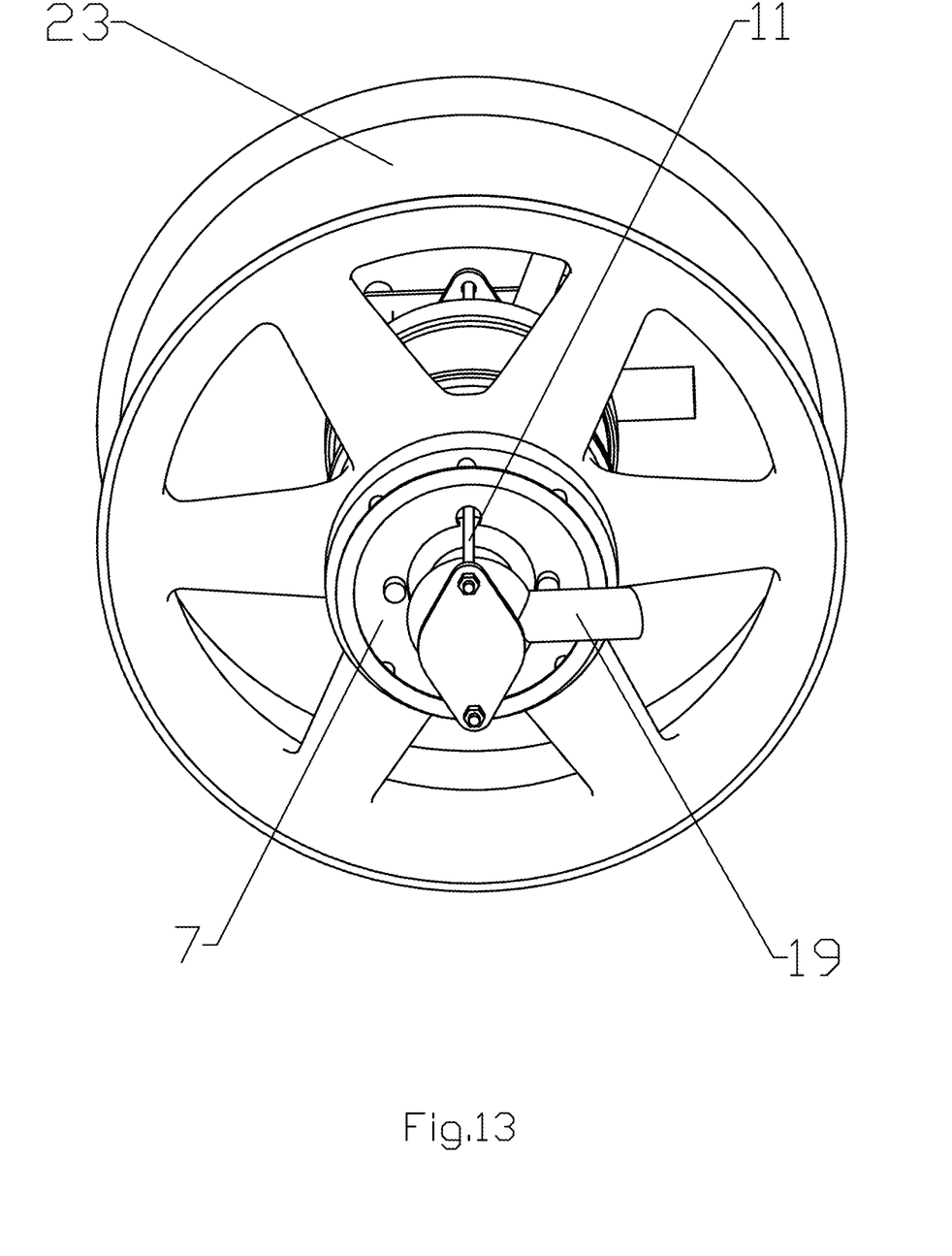
FIG. 13 Automobile engine: the wheel rim 23 is mounted directly on one of the rotors 6.

An automobile engine is shown in FIG. 13: the wheel rim 23 is mounted directly on one of the rotors 6.

High efficiency of the entire magnetic system is achieved with minimal air gaps. All magnetic fluxes that do not pass through the gaps should be closed by magnetic circuits, if possible. Fluxes closure can be made via the rods 4 and the rotor 6, made of materials with high magnetic permeability.

The proposed converter can also be used for converting rotary motion to reciprocating motion, for example, in a pump drive. In this case, the essence of operation does not change, the transfer of energy from the rotating rotor 6 to the moving reciprocating rod 4 occurs due to the interaction of the rotor magnets 3, the additional rotor magnets 5 and rod magnets 1, the additional rod magnets 2. This variant is also used when starting the engine by an external engine (starter) or by another method of rotating the rotor 6 by an external force.

In the starting mode, the rotors 6 are spun by an external force, the pistons 10 compress the air in the cylinders 14, into which the air-fuel mixture is supplied. When the fuel-air mixture self-ignites, the pistons 10 start moving in the opposite directions, moving the rods 4 and rotating the rotors 6 due to the magnetic interaction of the rod magnets 1 and rotor magnets 3, as well as additional rod magnets 2 and additional rotor magnets 5, if applicable.

Engine power can be adjusted by regulating the amount of fuel mixture supplied to the cylinders 14 through the intake manifold 20. It is also possible to create an engine with direct injection of the mixture in the cylinders 14. Then air will be supplied through the intake manifold 20, and fuel will be injected directly into the cylinders 14 by injectors.

The resistance of the compressed air in the cylinders 14 prevents the pistons 10 from hitting each other. The surface of the pistons 10 should be flat at high compression levels.

The engine can have ceramic bearings 18 without lubrication and with air cooling. This is possible due to the fact that the torque vector is parallel to the axis of the cylinder 14, and the piston 10 does not create a side load on the wall of the cylinder 14, as well as due to the ability to use high compression ratios that provide high thermal efficiency and relatively low exhaust gas temperature.

A power generating unit using an engine with the proposed converter can have field windings on the rotors 6 or permanent-magnet excitation. It can also use the rotor magnets 3 for excitation, having the poles placed on the outer or inner parts of the rotors 6. In this case, the stator of the power generating unit must cover the outer part of the rotors 6 or be located inside the inner part of the rotors 6.

The Best Embodiment of the Invention

The best version of the converter of reciprocating motion to rotary motion is the Modification, since the interaction magnetic force is higher while the dimensions of the converter stays the same. The best engine version will be an engine based on this converter version, the best power generating unit version will be a power generating unit version based on this converter version, and the best vehicle version will be the version based on the best engine and/or power generating unit version.

The internal parts of the engine with converter according to the Modification versions are shown in FIG. 4-11.

INDUSTRIAL APPLICABILITY

Performance capabilities of the Modification version of the engine was numerically calculated on a computer according to the method [7], which showed that with the outer diameter of the rotors 6 equal to 150 mm, the stroke of the rod 4 equal to 30 mm, and the piston diameter of 41.5 mm, the maximum power would be 12 hp at a piston vibration frequency of about 8400 per minute. The engine length was about 500 mm Such dimensions and capacity are suitable for a small vehicle or power generating unit. The power capacity can be changed if necessary by changing the size of the magnets and/or the number of magnets in the radial or axial direction, together with the change of the diameter of the cylinders. Increasing the number of rod magnets 1 and rotor magnets 3 in the radial direction is accompanied by a corresponding increase in the number of cylindrical concentric working surfaces.

REFERENCES

1. Sukharevsky V.V. (2016). Two-stroke internal combustion engine having magnetic motion conversing//Modern scientific research and innovation, No. 11 [Electronic resource]. URL: http://web.snaukasu/issues/2016/11/74548 (date accessed: 08.06.2018).
2. International patent application (PCT). Sukharevskiy Vladimir Vladimirovich. TWO-STROKE INTERNAL COMBUSTION ENGINE HAVING MAGNETIC MOTION CONVERSING. WO2018088925 (A1) published on 17 May 2018 with the priority date 14 Nov. 2016.
3. Sukharevsky V.V. (2014). Converter of reciprocating motion to rotary motion and a two-cylinder engine based on it//Modern scientific research and innovation, N° 10, Part 1 [Electronic resource]. URL: http://web.snaukasu/issues/2014/10/39944 (date accessed: 08.06.2018).
4. International patent application (PCT). Sukharevskiy Vladimir Vladimirovich. CONVERTER, TWO-CYLINDER ENGINE AND VEHICLE. WO2016068744 (A1) published on 6 May 2016 with the priority date 29 Oct. 2014.
5. Sukharevsky V.V. (2014). Model of a converter of reciprocating motion to rotary motion//Modern scientific research and innovation. No. 7 [Electronic resource]. URL: http://web.snaukasu/issues/2014/07/36455 (date accessed: 07.06.2018).
6. International patent application (PCT). Sukharevskiy Vladimir Vladimirovich. CONVERTER FOR CONVERTING RECIPROCATION MOTION TO ROTATIONAL MOTION, MOTOR AND VEHICLE. WO2016003305 (A1) published on 7 Jan. 2016 with the priority date 30 Jun. 2014.
7. Sukharevsky V.V. (2016). Kinematics and dynamics of an internal combustion engine with a magnetic converter of reciprocating motion to rotary motion//Modern scientific research and innovation. No. 2 [Electronic resource]. URL: http://web.snaukasu/issues/2016/02/64331 (date accessed: 07.06.2018).

What is claimed is:

1. A converter for converting of reciprocating motion into rotary motion, comprising:
- a pair of rotors rotating in opposite directions to each other when the converter starts to operate, with rotor magnets fixed on the rotors, wherein poles of the rotor magnets being placed on cylindrical working surfaces of the rotors;
- a pair of rods moving reciprocally opposite to each other along an axis of rotation of the rotors, with rod magnets attached to the rods, wherein poles of the rod magnets being placed on cylindrical working surfaces of the rods and being separated from the cylindrical working surfaces of the rotors by gaps;
- poles of the same polarity of the rotor magnets being located along lines on the cylindrical working surfaces of the rotors that have at least one local maximum and one local minimum in the direction of the axis of rotation of the rotor,
- the lines and an amplitude of the reciprocal movement of the rods are such that when the poles of the magnets of one rod, being influenced by an action of magnetic forces from the rotor magnets along the lines, reach areas of local maxima of the lines of the rotors at an extreme point of movement of the poles,
- the poles of the other rod magnets, being influenced by an action of magnetic forces from the rotor magnets along the lines, also reach an extreme point of movement of the poles, but in areas of local minima of the lines of the rotors,
- the rotors being fixed on framework bearings and are not able to move along their axis, which leads to maintaining rotation of the rotors in opposite directions,
- wherein at least some rod magnets have their poles placed simultaneously on several concentric cylindrical working surfaces of the rods.

2. The converter of claim 1, wherein at least some rotor magnets have their poles placed simultaneously on several concentric cylindrical working surfaces of the rotors.

3. The converter of claim 2 being a part of the internal combustion engine.

4. The converter of claim 1, wherein the rotor magnets are rotating or moving relative to each other for a clutching function.

5. The converter of claim 1 being a part of the internal combustion engine.

6. The converter of claim 5 being a part of a vehicle.

\* \* \* \* \*